US010255132B2

(12) United States Patent
Kalamatianos et al.

(10) Patent No.: US 10,255,132 B2
(45) Date of Patent: Apr. 9, 2019

(54) SYSTEM AND METHOD FOR PROTECTING GPU MEMORY INSTRUCTIONS AGAINST FAULTS

(71) Applicant: Advanced Micro Devices, Inc., Sunnyvale, CA (US)

(72) Inventors: John Kalamatianos, Boxborough, MA (US); Michael Mantor, Orlando, FL (US); Sudhanva Gurumurthi, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 140 days.

(21) Appl. No.: 15/190,015

(22) Filed: Jun. 22, 2016

(65) Prior Publication Data

US 2017/0371743 A1    Dec. 28, 2017

(51) Int. Cl.
| | |
|---|---|
| G06F 11/10 | (2006.01) |
| G06F 11/16 | (2006.01) |
| G06F 12/0866 | (2016.01) |
| G06F 11/00 | (2006.01) |
| H03M 13/00 | (2006.01) |

(52) U.S. Cl.
CPC ...... G06F 11/1064 (2013.01); G06F 11/1629 (2013.01); G06F 12/0866 (2013.01); *G06F 2212/1032* (2013.01); *G06F 2212/281* (2013.01); *G06F 2212/403* (2013.01)

(58) Field of Classification Search
CPC .............................. H04L 1/0041; H04L 1/58
See application file for complete search history.

(56) References Cited

U.S. PATENT DOCUMENTS

| | | | |
|---|---|---|---|
| 5,249,188 A * | 9/1993 | McDonald | G06F 11/1641 700/3 |
| 9,436,475 B2 * | 9/2016 | Chakrabarti et al. | G06F 9/38 |
| 2008/0066183 A1 * | 3/2008 | George | G06F 21/74 726/27 |
| 2017/0242809 A1 * | 8/2017 | Hirade | G06F 11/2231 |

OTHER PUBLICATIONS

Wadden, Jack et al., "Real-World Design and Evaluation of Compiler-Managed GPU Redundant Multithreading", 2014 ACM/IEEE 41st International Symposium on Computer Architecture (ISCA), Jun. 14-18, 2014, pp. 73-84, IEEE, Minneapolis, MN, U.S.

* cited by examiner

*Primary Examiner* — Guy J Lamarre
(74) *Attorney, Agent, or Firm* — Volpe and Koenig, P.C.

(57) ABSTRACT

A system and method for protecting memory instructions against faults are described. The system and method include converting the slave instructions to dummy operations, modifying memory arbiter to issue up to N master and N slave global/shared memory instructions per cycle, sending master memory requests to memory system, using slave requests for error checking, entering master requests to the GM/LM FIFO, storing slave requests in a register, and comparing the entered master requests with the stored slave requests.

21 Claims, 6 Drawing Sheets

SYSTEM AND METHOD FOR PROTECTING GPU MEMORY INSTRUCTIONS AGAINST FAULTS

GOVERNMENT RIGHTS

This invention was made with Government support under (Prime Contract No. DE-AC52-07NA27344, Subcontract No. B600716) awarded by Department of Energy (DOE). The Government has certain rights in this invention.

TECHNICAL FIELD

The disclosed embodiments are generally directed to faults associated with memory instructions, and in particular, to a system and method for protecting GPU memory instructions against faults.

BACKGROUND

Graphics Processing Units (GPUs) have been emerging as a power-efficient computing platform for executing General Purpose Computing (GPGPU) as well as 3D Graphics. Although the reliability needs of 3D Graphics are not currently critical, GPGPU software requires similar fault-tolerance capabilities to Central Processing Units (CPUs) including robust fault detection to prevent Silent Data Corruption (SDC) in GPGPU code. GPUs provide a massively parallel machine which employs large static random-access memory arrays. Traditional fault detection mechanisms such as ECC require a non-negligible area overhead in such systems. A low cost fault detection mechanism is required to reduce the area cost.

As the operating voltage of the GPU continues to drop and near-threshold operation becomes a design choice to control the power envelope, protection of both on-chip memories and logic in the GPU is needed. Fault protection of the GPU is especially critical in market segments such as server, cloud, real-time embedded, and the like, where the GPU plays an increasingly larger role in the context of GPGPU applications.

SUMMARY

A system and method for protecting memory instructions against faults are described. The system and method include converting the slave requests to dummy operations, modifying memory arbiter to issue N master and N slave global operations per cycle, sending master memory requests to memory system, using slave requests for error checking, entering master requests to the global memory (GM) FIFO, storing slave requests in a register, and comparing the entered master requests with the stored slave requests.

The system for protecting memory instructions against faults includes a memory arbiter that selects a memory instruction to issue, a master error check logic that receives master and slave operations based on the memory instruction and performs error checking based on the master and slave operations, a data error check logic that receives master and slave data based on the memory instruction and performs error checking based on the master and slave data, an address coalescing logic that receives master operations from the master error check logic based on the results of the error checking by the master error check logic, a memory request FIFO that receives the master operations from the address coalescing logic, an address error check that receives the master operations from the memory request FIFO and utilizes parity information from the master operations to check for errors, a memory data FIFO that receives master data from the data error check logic and utilizes parity information from the master operations to check for errors, and a data cache that receives the master operations from the address error check and the master data from the memory data FIFO and allows access by at least one single instruction multiple data (SIMD) processor to utilize the memory instruction. The system may also include a return FIFO that couples the operations from the data cache to the at least one SIMD by completing the memory access.

The system may include the data cache as one of a L1 data cache and a local data share (LDS). The system may include at least one pair of SIMDs arranged in a master/slave relationship. The system may include the memory arbiter that selects a master memory instruction and its equivalent, redundant slave memory instruction. The system may include the master and the slave instructions executed in lockstep.

The system may include the error checking of the master error check logic and/or the data error check logic that passes if there is no error. The system may include the error checking of the master error check logic and/or the data error check logic that causes a replay of the memory instruction if there is an error. The system may include utilizing parity information in the address error check or the memory data FIFO that passes if there is no error. The system may include utilizing parity information in the address error check or the memory data FIFO that causes a replay of the memory instruction from the address error check or the memory data FIFO if there is an error.

The system may include the memory instruction being a global memory instruction and the memory request FIFO and the memory data FIFO are global memory (GM) request FIFO and GM data FIFO, respectively. The system may include the memory instruction as a shared memory instruction and the memory request FIFO and the memory data FIFO are local memory (LM) request FIFO and LM data FIFO, respectively.

The method for protecting memory instructions against faults, includes selecting a master memory instruction and the master's slave memory instruction via a memory arbiter, executing the master instruction and slave instruction in lockstep, checking for errors using at least one error check logic, utilizing parity information on the master and slave instructions using at least one error check logic, executing the master instruction in a data cache, and returning status or data for both the master and slave instructions to the SIMD units that issued the master and slave instructions. The system may include a master/slave instruction pair issued from different SIMD units of a single compute unit and from different SIMD units of two compute units. The method may include a data cache that is one of a L1 data cache and an LDS. The method may include completing the master instruction via a return FIFO from the data cache to the at least two SIMD units, (the one that issued the master and the one that issued the slave instruction). The method may include passing the error check or the utilized parity information if there is no error. The method may include replaying the return of the status or data of the master instruction to the SIMD units if the error checking or the utilized parity information results in an error.

A computer readable non-transitory medium including instructions which when executed in a processing system cause the processing system to execute a method for protecting memory instructions against faults is disclosed. The method includes selecting a master instruction and the master's slave instruction via a memory arbiter, executing the master instruction and slave instruction in lockstep, checking for errors using at least one error check logic, utilizing parity information using at least one error check logic, executing the master instruction in a data cache, and completing both the master and slave instructions by at least two SIMDs.

BRIEF DESCRIPTION OF THE DRAWINGS

A more detailed understanding may be had from the following description, given by way of example in conjunction with the accompanying drawings wherein.

DETAILED DESCRIPTION

Figure 1:
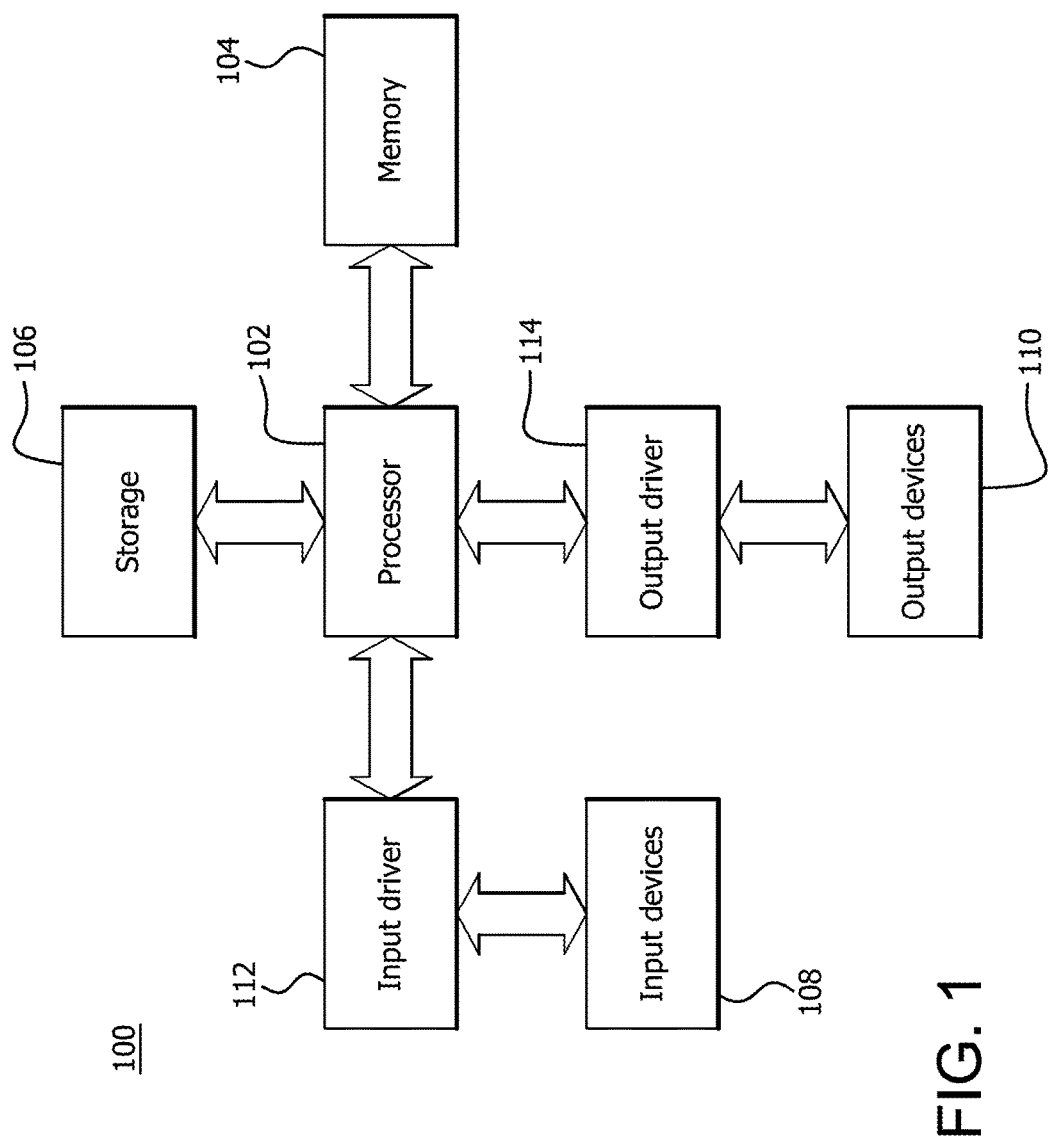
FIG. 1 is a block diagram of an example device in which one or more disclosed embodiments may be implemented.

Redundant multithreading (RMT) is one reliability technique that can protect large areas of GPU Compute hardware by providing low cost error detection capabilities with small area footprint. RMT protects hardware through redundant execution. The hardware that lies within the protection domain of RMT is referred to as the Sphere of Replication (SoR). Hardware that lies outside the SoR is protected via other means (e.g., ECC). Computation within the SoR is replicated, fed with the same inputs, and allowed to run independently. Before any state outside the SoR is updated, the outputs of the redundant computations are verified. If they match, a single copy of the output is allowed to modify the state outside the SoR. One form of RMT is Inter-WaveFront (Inter-WF). The computation at the WF granularity inside the Compute Unit (CU) boundaries is replicated and each pair of identical WFs is executed in lock step mode, as a master/slave pair, in different SIMD units. Lock step is enforced by synchronizing instruction execution for both the master and slave WF copies.

Another RMT technique is Inter-Compute Unit (Inter-CU). Inter-CU replicates work groups across neighboring CUs. The master and slave copy of each work group also synchronize instruction execution by forcing their respective WFs to operate in lock step mode.

In an embodiment, assignment of pairs of work groups across CUs occurs in a round-robin manner in order to utilize all CUs. For example, in a GPU with 4 CUs, master-slave work group pairs may be assigned in the following temporal and spatial order: CU0↔CU1, CU1↔CU2, CU2↔CU3, CU3↔CU0, etc. The assumption is that all the pairs of CUs are neighboring so the latency of communication between the CUs that host a master-slave work group pair may be minimized. Alternative arrangements may include different assignments of work groups to CUs.

The present sphere of replication (SoR) excludes the memory system (caches, main memory and local data share (LDS)). The CU's instruction scheduler may pick N global memory instructions per cycle across all SIMD units requiring N instances of Address Generation and Coalescing Logic per CU (AGCL). This logic generates the addresses of the memory requests for each of the N picked vector memory instructions and then coalesces them in order to reduce the pressure on the L1 data cache (DC) and the L1 data TLB (DTLB). Each memory instruction may generate up to 64 requests to the memory system given a WF size of 64 work items.

A system and method for protecting memory instructions against faults are described. The system and method include modifying the global memory instruction arbiter to issue N master and slave instructions per cycle after converting the slave memory requests generated by the slave instructions to dummy operations, and sending master memory requests only to the memory system. They also include temporarily storing slave requests for command and data error checking with their master equivalents and using parity for address error checking.

A system and method for protecting memory instructions against faults are described. The system and method include converting the slave requests to dummy operations, modifying memory arbiter to issue N master and N slave global memory instructions per cycle, sending master memory requests only to memory system, using slave requests for error checking, entering master requests to the GM FIFO, storing slave requests in a register, and comparing the master requests with the stored slave requests before they enter the GM FIFO. While FIFO is used herein, FIFO is only an example of queuing/memory management and other known queuing/memory management methods may be used in the present system.

The system for protecting memory instructions against faults includes a memory arbiter that selects a memory instruction from a master WF to issue along with its redundant copy from a slave WF, a master error check logic that receives master and slave requests based on the master and slave memory instructions issued and performs error checking on the master and slave operations, a data error check logic that receives master and slave data based on the master and slave memory instructions issued and performs error checking on the master and slave request data, an address coalescing logic that receives master operations from the master error check logic based on the results of the error checking by the master error check logic, a memory request FIFO that receives the master operations from the address coalescing logic, an address error check that receives the master operations from the memory request FIFO and utilizes parity information from the master operations to check for errors, a memory data FIFO that receives master data from the data error check logic and utilizes parity information from the master data to check for errors, and a data cache that receives the master operations from the address error check and the master data from the memory data FIFO and allows access by at least one single instruction multiple data (SIMD) processor to utilize the memory instruction. The system may also include a return FIFO that couples the master operations from the data cache to the at least two SIMDs by completing the memory access for both the master and slave memory instructions.

The system may include the data cache as one of a L1 data cache and an LDS. The system may include the at least one pair of SIMDs arranged in a master/slave relationship. The system may include the memory arbiter that selects a master instruction and its equivalent slave instruction. The system may include the master instruction and the slave instruction executed in lockstep.

The system may include the error checking of the master error check logic or the data error check logic that passes if there is no error. The system may include the error checking of the master error check logic or the data error check logic that causes a replay of the memory instruction if there is an error. The system may include utilizing parity information in the address error check or the memory data FIFO that passes if there is no error. The system may include utilizing parity information in the address error check or the memory data FIFO that causes a replay of the memory instruction from the address error check and the memory data FIFO if there is an error.

The system may include the memory instruction being a global memory instruction and the memory request FIFO and the memory data FIFO are global memory (GM) request FIFO and GM data FIFO, respectively. The system may include the memory instruction is a shared memory instruction and the memory request FIFO and the memory data FIFO are local memory (LM) request FIFO and LM data FIFO, respectively.

The method for protecting memory instructions against faults, includes selecting a master instruction and the master's slave instruction via a memory arbiter, executing the master instruction and slave instruction in lockstep, checking for errors between master and slave operations using at least one error check logic, utilizing parity information on the master and slave operations using at least one error check logic, storing the master operation in a data cache, and completing both the master and slave instructions in lockstep by sending status/data of the master operations to at least two SIMDs. The system may include the master/slave memory instruction pair issued by two SIMDs in a single compute unit or by two SIMDs in two compute units. The method may include a data cache that is one of a L1 data cache and a local data share (LDS). The method may include completing the master instruction in lockstep with the slave instruction via a return FIFO from the data cache to the at least two SIMDs. The method may include passing the error check or the utilized parity information if there is no error. The method may include replaying the master operations if the error checking or the utilized parity information results in an error.

A computer readable non-transitory medium including instructions which when executed in a processing system cause the processing system to execute a method for protecting memory instructions against faults is disclosed. The method includes selecting a master instruction and the master's slave instruction via a memory arbiter, executing the master instruction and slave instruction in lockstep, checking for errors between master and slave operations using at least one error check logic, utilizing parity information on the master operations using at least one error check logic, executing the master operation in a data cache, and completing both the master and slave instructions in lockstep operation by sending status/data to at least two SIMDs.

The system and method will be further described herein with respect to the included figures.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

In order to protect the global memory instructions inside the CU without compromising the peak global memory instruction issue rate of N, an embodiment includes modifications to the global memory instruction arbiter to issue 2*N memory instructions, N of which are master and N are their slave equivalents. Both master and slave memory operations may read their operands and data (if they are stores), may perform an error check between them and may send only the master instruction operands to each AGCL block for address generation. Slave instruction memory or address translation requests may not be sent to the memory system, assuming that the latter is protected by other techniques, other than RMT. Moreover, the N AGCL blocks may not be partitioned instances for master and slave memory instructions in order to perform the error check on the actual addresses of the memory requests or the coalesced equivalents. Such an error check may have cut the peak global memory issue rate in half and may have limited the memory level parallelism of the GPU. Instead each AGCL block uses parity on its internal memory structures and replicates its logic blocks to protect against errors while generating addresses and coalescing for the master instruction only.

Figure 2:
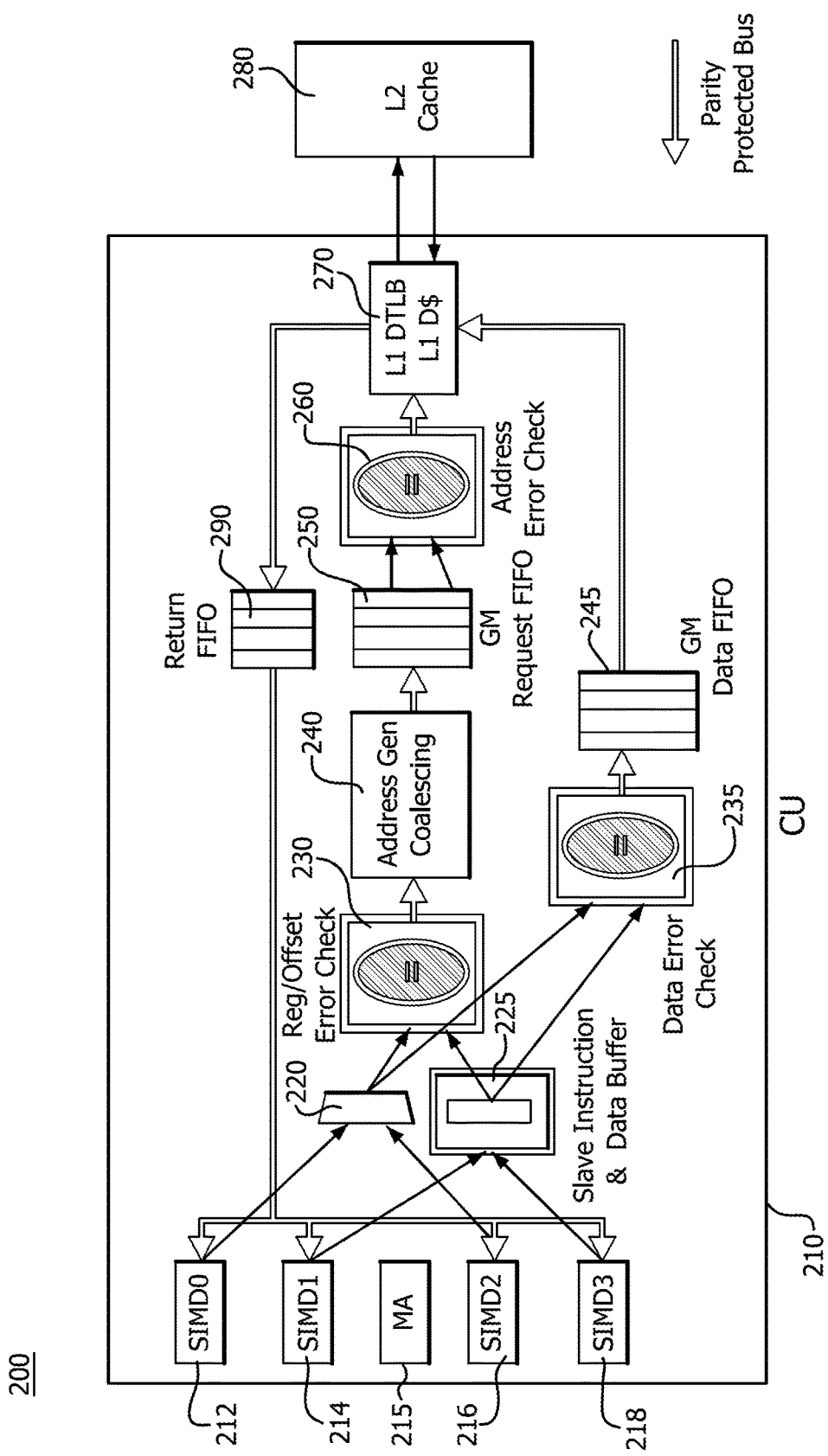
FIG. 2 is a system diagram illustrating error protection support for global memory instructions under Inter-Wave-Front (Inter-WF) redundant multithreading (RMT)

FIG. 2 depicts a system 200 illustrating error protection support for global memory instructions under Inter-WF RMT. As shown in FIG. 2, system 200 includes a CU 210. CU 210 includes four SIMDs, SIMD0 212, SIMD1 214, SIMD2 216, and SIMD3 218. Although four SIMDs are shown any number may be used. Generally, an even number of SIMDs may be used, and odd number of SIMDs may be used, although this would require the master/slave pairings to be determined in process. The four SIMDs 212, 214, 216, 218 may be arranged in pairs into two master/slave relationships in any combination. For ease of discussion, the present pairing operates by pairing SIMD0 212 and SIMD1 214, and SIMD2 216 and SIMD3 218. The master SIMD in each pair SIMD0 212 and SIMD2 216 may be communicatively coupled to multiplexor 220, while the slave SIMD in each pair SIMD1 214 and SIMD3 218 may be communicatively coupled to slave instructions and data buffer (SIDB) 225. Multiplexor 220 and SIDB 225 both provide inputs to the register/offset error checker 230 and data error checker 235.

From this point there are two parallel paths. The first finds the output of the register/offset error check 230 serially coupled to address generator coalescing 240 that is coupled to GM Request FIFO 250 and address error check 260 before the signal is input into L1 DTLB/L1 Data Cache 270. The second path has the output of data error checker 235 coupled to GM data FIFO 245 that is then coupled to L1 DTLB/L1 Data Cache 270.

L1 DTLB/L1 Data Cache 270 is communicatively coupled with the L2 cache housed outside of CU 210. L1DTLB/L1 Data Cache 270 also provides an input to return FIFO 290 the output of which is feedback into SIMDs 212, 214, 216, 218

The error check 230 at the input of each AGCL 240 may be performed as follows: Since each master and slave pair of WF SIMD0 212 and SIMD1 214 and SIMD2 216 and SIMD3 218 operate in lock step mode (in either RMT mode), the mode of operation to a memory arbiter 215 of each CU 210 may be expanded. When RMT is enabled, slave WF SIMD1 214 and SIMD3 218 issued memory instructions may be converted into dummy operations and modify memory arbiter 215 to issue N master and N slave global memory instructions per cycle. The SoR excludes a plurality of caches, including L1 data cache 270, L2 cache 280, and the TLBs, including L1 DTLB 270. The slave WF SIMD1 214 and SIMD3 218 memory instructions may be used for error checking. Since the memory arbiter operates in lock step mode, by selecting a master WF instruction SIMD0 212 or SIMD2 216, the associated slave WF instruction SIMD1 214 or SIMD3 218 is also selected. The overall memory instruction issue requirements remain the same, as long as the number of SIMDs is greater or equal to 2*N, because the slave WF instruction issued from SIMD1 214 or SIMD3 218 is not issued to the Global Memory (GM) FIFO 250 as only the master WF instruction issued from SIMD0 212 or SIMD2 216 enters the GM FIFO 250. Slave WF instructions issued from SIMD1 214 or SIMD3 218 may be temporarily stored in a register, slave GM Buffer (SGMB) 225. SGMB 225 may store the information needed to generate the virtual address (source registers, offset, segment if required, destination registers). This information is compared against the information coming out of multiplexor 220 that selects a master WF global memory instruction from the SIMD units SIMD0 212 or SIMD2 216 that execute master WFs, in Reg/Offset Error Check 230. There are N SGMBs 225 and N multiplexers 220 per CU 210 to support issuing up to N global memory instructions per cycle. For a store instruction, the SGMB 225 also maintains temporary storage for the data as well. The N SGMBs 225 may support storing data for up to N stores per cycle. The data from SGMB is compared, in Data Error Check 235, against the data coming out of multiplexor 220, which is fed from all the SIMD units SIMD0 212 or SIMD2 216 that execute master WF instructions.

If no error is found either in the instruction error check logic 230 (for loads or stores) or in the data error check logic 235 (for stores), the slave WF instruction is dropped after tagging the master WF instruction with a unique WF tag id that will identify its destination register file later on when the response arrives from the memory system, L1 DTLB 270, L1 Data Cache 270 and L2 cache 280. If an error is found, then both the master and slave instructions may be replayed by the CU instruction scheduler. The replay corrects transient faults and may detect hard faults. If the error persists the Machine Check Architecture (MCA) (not shown in FIG. 2) is notified and the normal error logging or correction flow is triggered. The MCA is the architectural flow supporting error logging and reporting, and may be independent of RMT.

Once the master WF instruction enters the AGCL 240, parity may be used in all internal buffers and duplication in the address generation and coalescing logic 240 to allow for error protection of the master WF requests and the associated virtual addresses. Once the requests of the global memory instruction have generated their addresses in the AGCL 240, the requests enter the GM Request FIFO 250, which is also protected by parity. Each master WF request also carries the unique slave WF tag id. As the requests are picked and sent to the memory system, L1 DTLB/L1 Data Cache 270 and L2 cache 280, from the GM Request FIFO 250, the slave WF tag id is sent to the GM Return FIFO 290 entries reserved for their data (for load requests) or for status (for store requests). During that time, a check for address errors is performed using the parity bits of the selected GM Request FIFO entry via Address Error Check 260. If an error occurs, the request is replayed by picking the data from the FIFO 250. If the error persists, then the MCA is notified and normal error logging flow is followed. If no error occurs, the request is sent to the memory system, L1 DTLB/L1 Data Cache 270 and L2 cache 280, as usual. For store requests, the data of the master WF instruction is sent to the GM data FIFO 245 and the data of the slave WF instruction is dropped after the error check. By doing so, capacity requirements remain the same (with either RMT mode enabled) in the GM data FIFO 245 since there is no need to store slave WF data. Register file read bandwidth may not be saved because the requirement to read the data of the slave WF store instructions from the register file still may exist.

When the response arrives from global memory, it is first sent to the GM Return FIFO 290 and then forwarded to any two of the SIMD units SIMD0 212, SIMD1 214, SIMD2 216, SIMD3 218 of both the master WF and the slave WF requests, such as by using the slave WF tag id. Such delivery avoids duplicating the data bus and prevents additional area and power overhead while allowing errors in the data bus to go undetected because faulty data from global memory can be transferred simultaneously to both master and slave WFs. Therefore, data bus errors may propagate to both register files and may not be captured by this flow.

In order to address this issue, parity may be used as a mechanism to detect errors in the data bus. A parity error triggers a data transfer replay. If the error persists, the MCA is notified and the typical error logging or correction flow may be followed. This optimization saves bandwidth on the single data bus used for load data transfers. In the absence of this optimization, there may be a need to transfer the memory data to the slave WF's register file separately, thus doubling the data bus bandwidth requirements.

Figure 3:
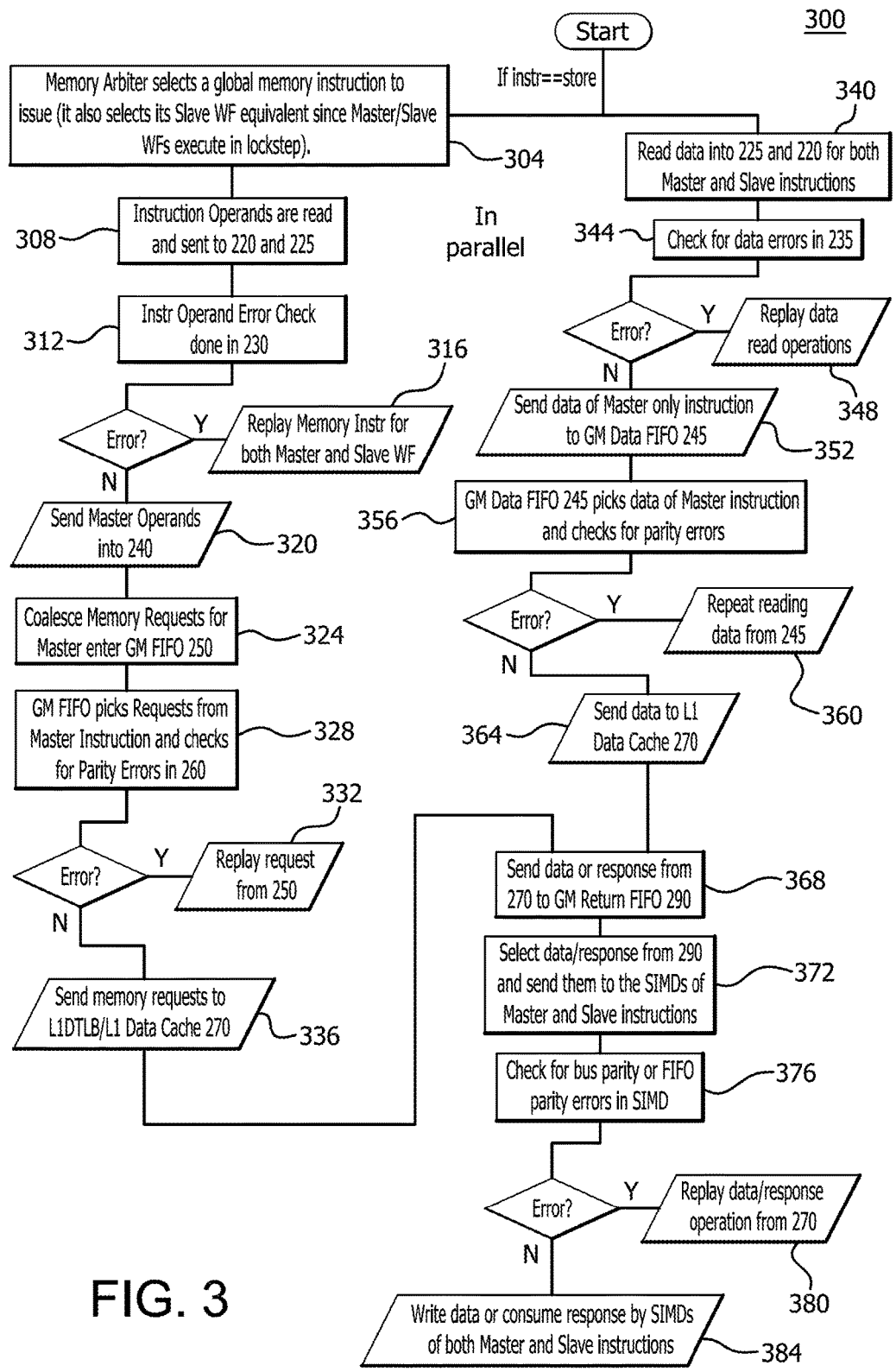
FIG. 3 illustrates a method for providing error checking support.

FIG. 3 illustrates a method 300 for providing error checking support within the system shown in FIG. 2. Method 300 includes the memory arbiter 215 selecting a global memory instruction to issue, while selecting its Slave WF equivalent since Master/Slave WFs execute in lockstep, at step 304.

Instruction Operands may be read and sent to multiplexor 220 and SGMB 225, at step 308. At step 312, the Instruction Operand Error Check may be performed in error check logic 230. If there is an error, then the memory instruction may be replayed for both Master and Slave WF, at step 316. If there is no error, then the Master Operands may be sent to AGCL 240, at step 320.

Step 324 may include coalescing of Memory Requests for Master instruction entering GM FIFO 250. At step 328, the GM FIFO 250 picks requests from master instruction and checks for parity errors in Address Error Check 260. If there is an error, then the request may be replayed from GM Request FIFO 250 at step 332. If there is no error, then the memory requests may be sent to L1DTLB/L1 Data Cache 270 at step 336.

In parallel to step 304, data may be read (if instruction is a store) into SGMB 225 and multiplexor 220 for both Master and Slave instructions, at step 340. The data may be checked for errors in data error check 235 at step 344. If there is an error, the data read operation from the register file may be replayed at step 348. If there is no error, then the data for the master instruction only may be sent to GM Data FIFO 245 at step 352.

At step 356, GM Data FIFO 245 may pick data of master instruction and check for parity errors. If there is an error, then the reading of the data may be repeated from GM Data FIFO 245, at step 360. If there is no error, then the data may be sent to L1 Data Cache 270, at step 364.

After receiving the memory requests from step 336 and/or step 364, data or response may be sent from L1 Data Cache 270 to GM Return FIFO 290, at step 368. At step 372, the data/response may be selected from GM Return FIFO 290 and sent to the SIMDs of Master and Slave instructions. The parity may be checked for bus parity or FIFO parity errors in SIMD, at step 376. If there is an error, then the data/response operation may be replayed from L1 Data Cache 270, at step 380. If there is no error, the data may be written or consumed response in both SIMDs, at step 384.

Figure 4:
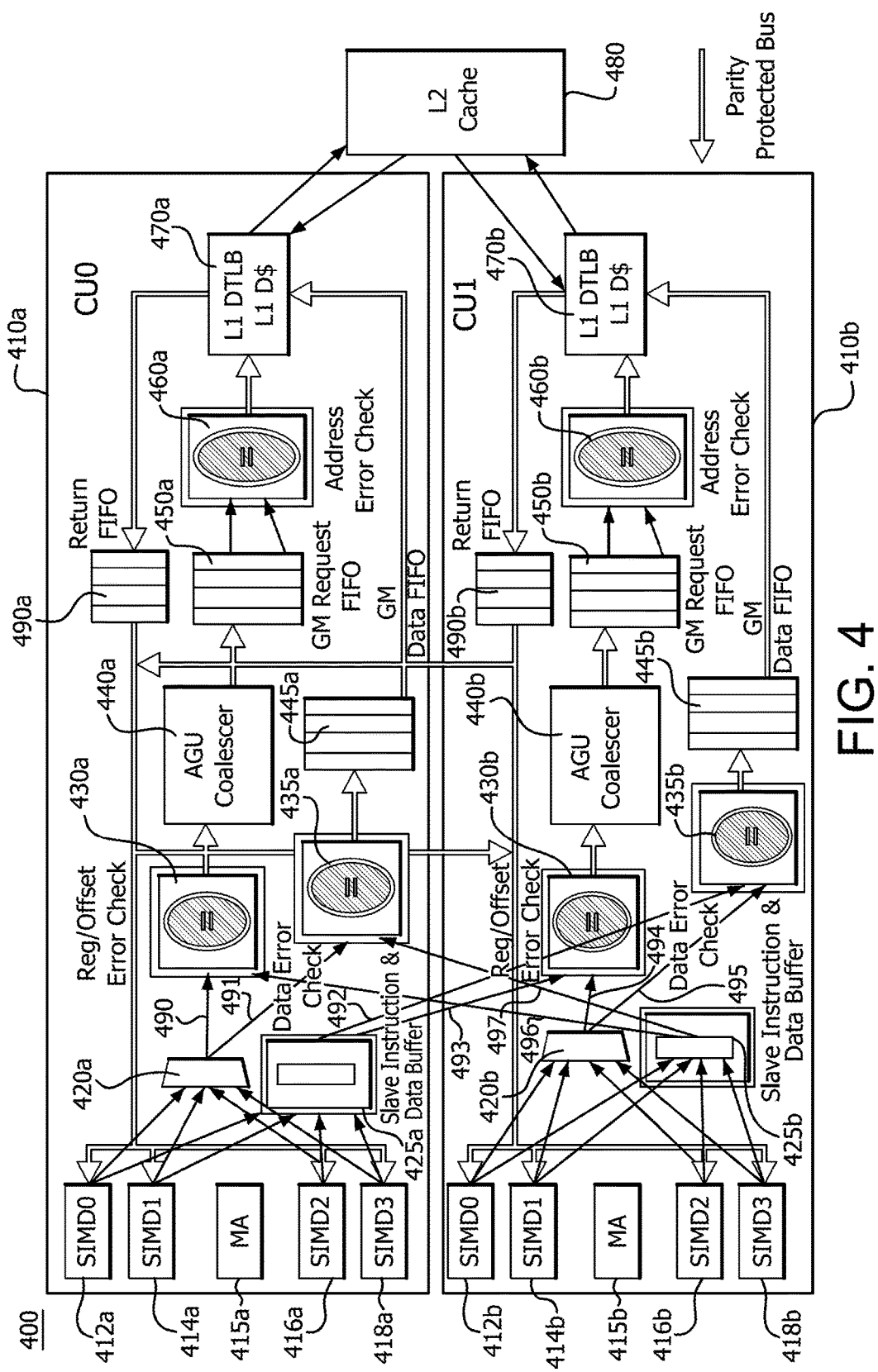
FIG. 4 is a system diagram illustrating error protection support for global memory instructions under Inter-Compute Unit (Inter-CU) RMT.

FIG. 4 depicts a system 400 illustrating error protection support for global memory instructions under Inter-CU RMT. As shown in FIG. 4, system 400 includes two CUs 410a,b. Each CU 410a,b includes four SIMDs, SIMD0 412a,b, SIMD1 414a,b, SIMD2 416a,b, and SIMD3 418a,b, as well as memory arbiters 415a,b. Although four SIMDs per CU are shown, any number may be used. Generally, an even number of SIMDs may be used, and odd number of SIMDs may be used, although this would require the master/slave pairings to be determined in process. The four SIMDs per CU 412, 414, 416, 418 may be arranged in pairs into two master/slave relationships in any combination. For ease of discussion, the present pairing operates by pairing SIMD0 412a and 412b, SIMD1 414a and 414b, SIMD2 416a and 416b, and SIMD3 418a and 418b. The master SIMD in each pair 41Xa may be communicatively coupled to multiplexor 420a and SIDB 425a, while the slave SIMD in each pair SIMD 41Xb may be communicatively coupled to multiplexor 420b and SIDB 425b. Multiplexors 420a,b and SIDB 425a,b both provide inputs to the register/offset error checker 430a,b and data error checker 435a,b.

From this point there are two parallel paths in each CU. The first finds the output of the register/offset error check 430a,b serially coupled to address generator coalescing 440a,b that is coupled to GM Request FIFO 450a,b and address error check 460a,b before the signal is input into L1 DTLB/L1 Data Cache 470a,b. The second path has the output of data error checker 435a,b coupled to GM data FIFO 445a,b that is then coupled to L1 DTLB/L1 Data Cache 470a,b.

L1 DTLB/L1 Data Cache 470a,b is communicatively coupled with the L2 cache 480 housed outside of CU 410a,b. L1DTLB/L1 Data Cache 470a,b also provides an input to return FIFO 490a,b the output of which is feedback into SIMDs 412a,b, 414a,b, 416a,b, and 418a,b.

The main property of the inter-CU RMT error protection support system 400 is that the SIDBs 425a,b lies on the CU hosting the slave WFs while the multiplexers 420a,b steering the master WF payload lie on another CU that hosts the master WFs. As a result, system 400 may require busses across the two CUs, 410a,b to allow the transfer of the payload to be checked. This is shown by the links, 490, 491, 492, 493, 494, 495, 496, 497 between the multiplexers 420a,b and SIDBs 425a,b and the error check logic 430a,b and 435a,b. Buses crossing the CU boundaries may carry the data from memory to the slave WFs. In FIG. 4, both parity protected busses, one from CU0 410a to CU1 410b that allows data and completion status forwarding from the master WFs of CU0 410a to the slave WFs in CU1 410b and another from CU1 410b to CU0 410a that allows data and completion status forwarding from the master WFs of CU1 410b to the slave WFs in CU0 410a are shown. As would be understood, this configuration is based on the fact that this GPU has only two CUs. In general, in a GPU with M CUs, each CU would have one incoming bus to receive payload for the slave WFs it hosts and one outgoing bus to forward payload from the master WFs its hosts.

Figure 5:
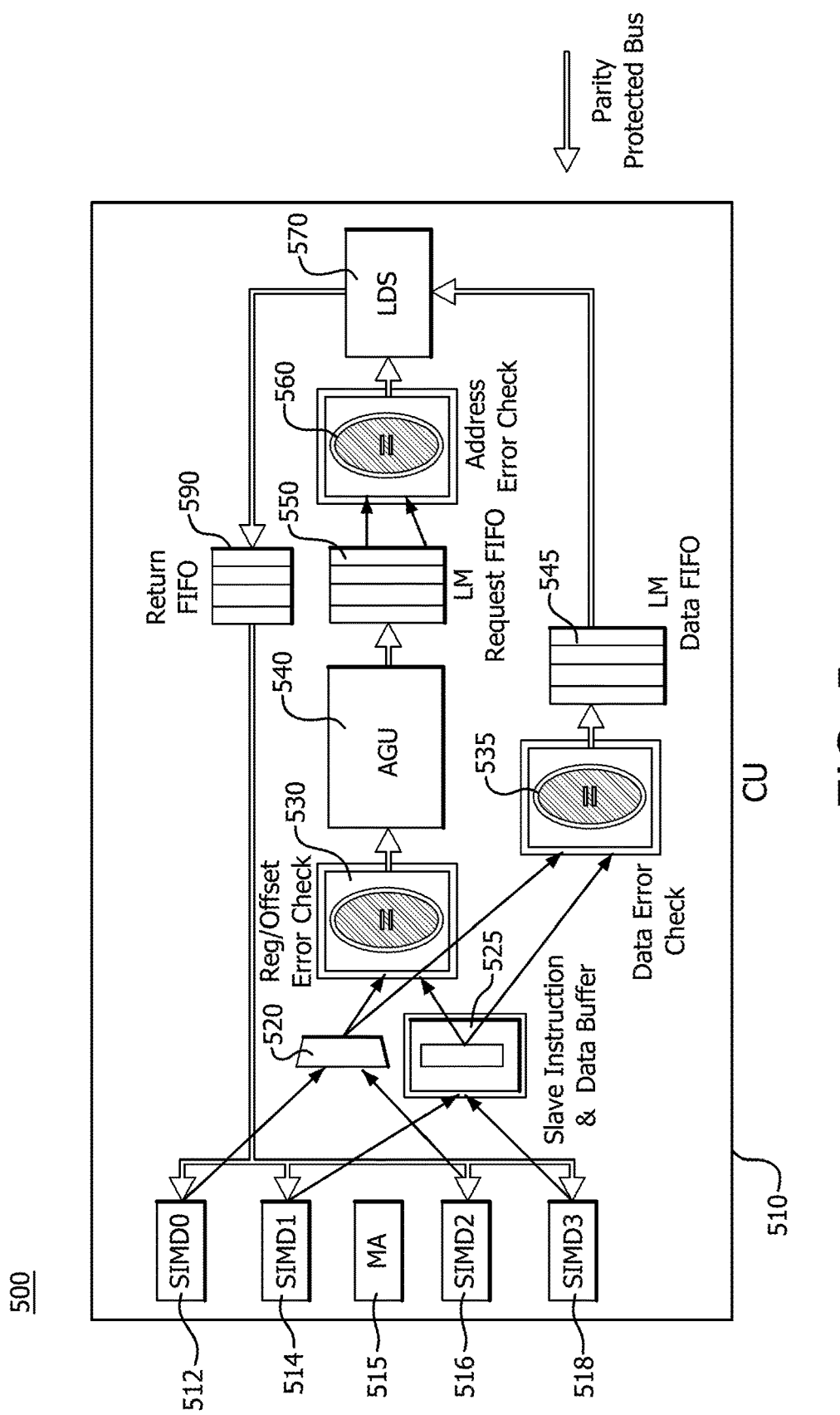
FIG. 5 is a system diagram illustrating error protection support for shared memory instructions under Inter-WF RMT.

FIG. 5 depicts a system 500 illustrating error protection support for shared memory instructions under Inter-WF RMT. As shown in FIG. 5, system 500 includes a CU 510. CU 510 includes four SIMDs, SIMD0 512, SIMD1 514, SIMD2 516, and SIMD3 518, as well as memory arbiter 515. Again, although four SIMDs are shown any number may be used. Generally, an even number of SIMDs may be used, and odd number of SIMDs may be used, although this would require the master/slave pairings to be determined in process. The four SIMDs 512, 514, 516, 518 may be arranged in pairs into two master/slave relationships in any combination. For ease of discussion, the present pairing operates by pairing SIMD0 512 and SIMD1 514, and SIMD2 516 and SIMD3 518. The master SIMD in each pair SIMD0 512 and SIMD2 516 may be communicatively coupled to multiplexor 520, while the slave SIMD in each pair SIMD1 514 and SIMD3 518 may be communicatively coupled to slave instructions and data buffer (SIDB) 525. Multiplexor 520 and SIDB 525 both provide inputs to the register/offset error checker 530 and data error checker 535.

From this point there are two parallel paths. The first finds the output of the register/offset error checker 530 serially coupled to address generator coalescing 540 that is coupled to LM Request FIFO 550 and address error checker 560 before the signal is input into LDS 570. The second path has the output of data error checker 535 coupled to LM data FIFO 545 that is then coupled to LDS 570. LDS 570 provides an input to return FIFO 590 and the output of FIFO 590 is feedback into SIMDs 512, 514, 516, 518.

The error protection support for the shared memory instructions that target the Local Data Store (LDS) 570 is similar to the one for global memory traffic described herein. There is no duplication of the data buses to and from the LDS 570 and slave WF shared memory loads and stores do not access the LDS 570. In other words, the full LDS capacity and bandwidth is available to the master WFs and the LDS 570 is not protected, i.e. lies outside the SoR as discussed above. Master WF requests to LDS 570 transfer data over the data buses which are also protected by parity to provide error protection, in similar fashion to global memory traffic. FIG. 5 shows the error check logic needed to provide similar levels of error protection to the shared memory instructions with inter-WF RMT.

The main differences between the error protection support for global and shared memory instructions include no address coalescing for shared memory traffic and the number of SIDBs 525 needed for error checking may be different from the number of Global Memory SIDBs.

There is no address coalescing logic for shared memory traffic in the baseline GPU since LDS 570 is a memory that is explicitly managed by software. Thus, there is no duplication of address coalescing logic needed for protection. In addition, since the number of memory requests accessing LDS 570 remains the same when RMT is enabled, the LDS 570 bandwidth requirements remain the same, as opposed to global memory traffic where address coalescing logic may change the final number of coalesced memory requests reaching the L1 Data Cache and L1 DTLB 270.

The number of SIDBs 525 needed for error checking is equal to the maximum number of memory instructions accessing the LDS 570 per cycle by the CU 510 instruction scheduler. This number may be different than the maximum number of global memory instructions issued per cycle.

Figure 6:
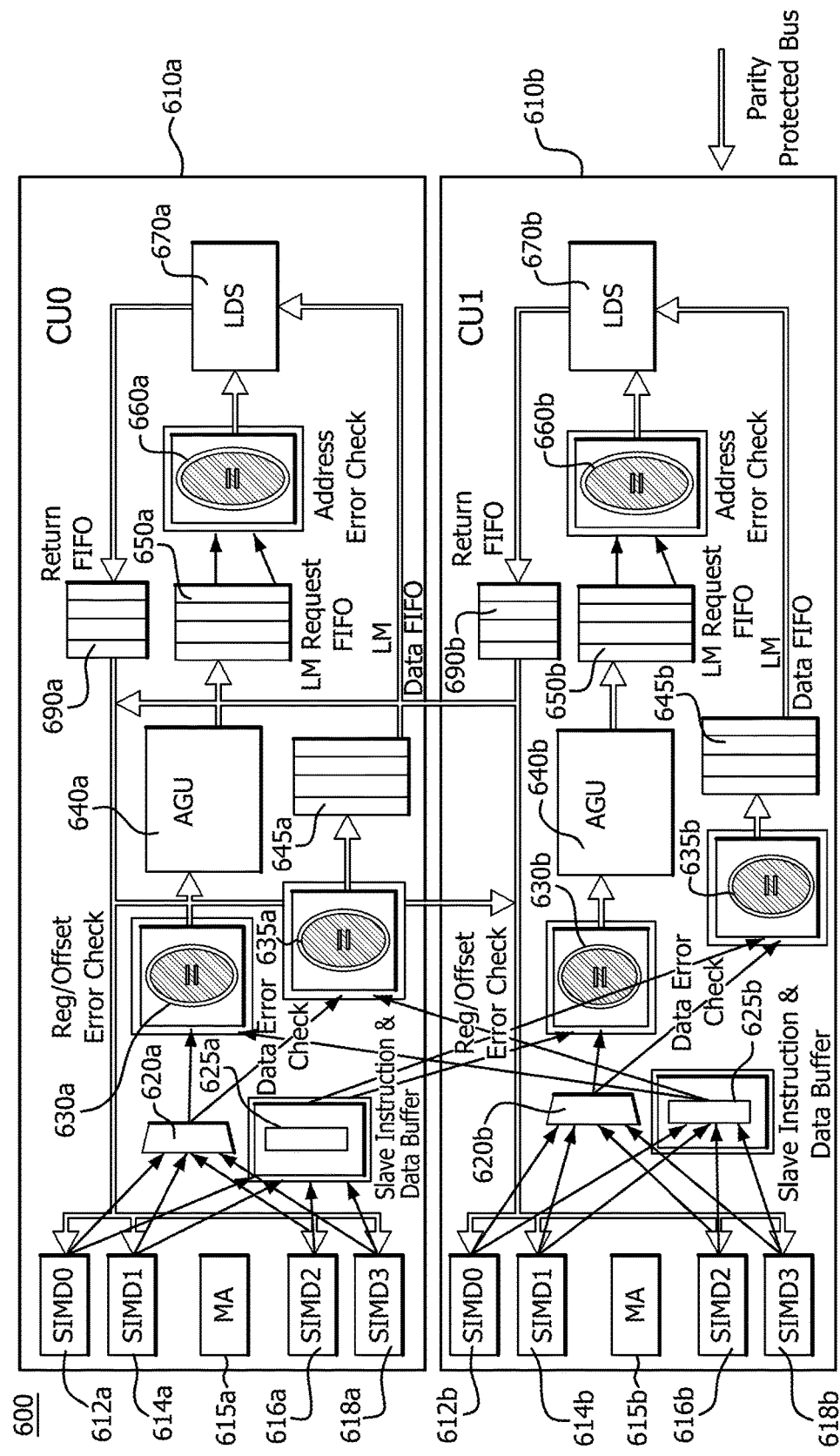
FIG. 6 is a system diagram illustrating error protection support for shared memory instructions under Inter-CU RMT.

FIG. 6 depicts a system 600 illustrating error protection support for shared memory instructions under Inter-CU RMT. Similar to the case of global memory traffic, error protection may be extended for shared memory instructions for inter-CU RMT as shown in FIG. 6. The error check logic is identical to that of global memory traffic described above. The differences are the same as those listed above for inter-WF RMT. As is the case with the error support for shared memory traffic under inter-WF RMT, no LDS capacity is sacrificed and LDS continues to lie outside the SoR. The full LDS capacity of CU0 is utilized by master WFs running on that CU, while the LDS of CU1 is used by master WFs running on CU1. So there may be at least two master work groups to utilize both LDS modules in a two-CU configuration operating under inter-WF RMT.

As shown in FIG. 6, system 600 includes a plurality of CUs, CU 610*a,b*. While two CUs are shown in FIG. 6, any number of CUs may be utilized. CU 610*a* includes memory arbiter 615*a* and four SIMDs, SIMD0 612*a*, SIMD1 614*a*, SIMD2 616*a*, and SIMD3 618*a*. CU 610*b* includes memory arbiter 615*b* and four SIMDs, SIMD0 612*b*, SIMD1 614*b*, SIMD2 616*b*, and SIMD3 618*b*. Again, although four SIMDs in each CU are shown any number may be used. Generally, an even number of SIMDs may be used, and odd number of SIMDs may be used, although this would require the master/slave pairings to be determined in process. The four SIMDs 612*a*, 614*a*, 616*a*, 618*a* may be arranged in pairs with four SIMDs 612*b*, 614*b*, 616*b*, 618*b* in two master/slave relationships in any combination. For ease of discussion, the present pairing operates by pairing SIMD0 612*a,b*, SIMD1 614*a,b*, SIMD2 616*a,b*, and SIMD3 618*a,b*. The master SIMD in each pair SIMD0 612*a*, SIMD1 614*a*, SIMD2 616*a*, and SIMD3 616*a* may be communicatively coupled to multiplexor 620*a* and SIDB 625*a*, while the slave SIMD in each pair SIMD0 612*b*, SIMD1 614*b*, SIMD2 616*b*, and SIMD3 618*b* may be communicatively coupled to multiplexor 620*b* and SIDB 625*b*. Multiplexor 620*a,b* and SIDB 625*a,b* both provide inputs to the register/offset error checker 630*a,b* and data error checker 635*a,b*.

From this point there are two parallel paths. The first finds the output of the register/offset error checker 630*a,b* serially coupled to address generator coalescing 640*a,b* that is coupled to LM Request FIFO 650*a,b* and address error checker 660*a,b* before the signal is input into LDS 670*a,b*. The second path has the output of data error checker 635*a,b* coupled to LM data FIFO 645*a,b* and then coupled to LDS 670*a,b*. LDS 670*a,b* provides an input to return FIFO 690*a,b* the output of which is fed back into SIMDs 612*a,b*, 614*a,b*, 616*a,b*, 618*a,b*.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for protecting memory instructions against faults, the system comprising:
   a memory arbiter that selects a master/slave memory instruction pair to issue responsive to a memory request, wherein the master instruction and the slave instruction are executed in lockstep;
   a data cache that receives the master instruction and allows access by at least two single instruction multiple data (SIMD) processors to complete the memory access for both the master and slave memory instructions;
   a data error check logic that receives master and slave instruction data and performs data error check logic error checking between the master and slave operations; and
   a memory data that receives master data from the data error check logic and utilizes parity information from the master instruction to check for errors.

2. The system of claim 1 wherein data cache is one of a L1 data cache and a local data share (LDS).

3. The system of claim 1 further comprising a return that returns the instructions from the data cache to the at least two SIMDs and completes both the master and slave instructions.

4. The system of claim 1 wherein the at least one pair of SIMDs arranged in a master/slave relationship.

5. The system of claim 1 wherein the memory arbiter picks a master instruction and its equivalent slave instruction issued from the pair of SIMDs arranged in master/slave relationship.

6. The system of claim 1, further comprising:
a master error check logic that receives master and slave memory instructions and performs master error check logic error checking between the master and slave operations;
an address coalescing logic that receives master requests from the master error check logic based on results of the error checking by the master error check logic; and
an address error check that receives the master instruction from the memory request and utilizes parity information from the master instruction to check for errors.

7. The system of claim 6 wherein the error checking of the master error check logic or the data error check logic passes if there is no error.

8. The system of claim 6 wherein the error checking of the master error check logic or the data error check logic causes a replay of the memory instruction if there is an error.

9. The system of claim 6 wherein utilizing parity information in the address error check or the memory data passes if there is no error.

10. The system of claim 6 wherein utilizing parity information in the address error check or the memory data causes a replay of the memory instruction from the address error check and the memory data if there is an error.

11. The system of claim 1 wherein the memory instruction is a global memory instruction and the memory request and the memory data are global memory (GM) request and GM data, respectively.

12. The system of claim 1 wherein the memory instruction is a shared memory instruction and the memory request and the memory data are local memory (LM) request and LM data, respectively.

13. The system of claim 1 wherein the master/slave memory instruction pair is issued from a pair of SIMDs of a single compute unit and from a pair of SIMDs forming two compute units.

14. A method for protecting memory instructions against faults, the method comprising:
selecting a master instruction and the master's slave instruction via a memory arbiter responsive to a memory request;
executing the master instruction and slave instruction in lockstep;
checking for errors between master and slave instruction using at least one error check logic; and
completing the memory access to the master and slave instructions by returning data/status at least two SIMDs.

15. The method of claim 14 wherein data cache is one of a L1 data cache and a local data share (LDS).

16. The method of claim 14 further comprising coupling the master instruction to the at least two SIMDs.

17. The method of claim 14 further comprising passing an error check or a utilized parity information if there is no error.

18. The method of claim 14 further comprising replaying the master and slave operations if an error check or a utilized parity information results in an error.

19. The method of claim 14 further comprising utilizing parity information on the master instruction using at least one error check logic.

20. The method of claim 14 further comprising executing the master instruction in a data cache.

21. A computer readable non-transitory medium including instructions which when executed in a processing system cause the processing system to execute a method for protecting memory instructions against faults, the method comprising:
selecting a master instruction and the master's slave instruction via a memory arbiter responsive to a memory request;
executing the master instruction and slave instruction in lockstep;
checking for errors between master and slave instruction using at least one error check logic; and
completing the memory access to the master and slave instructions by returning data/status at least two SIMDs.

* * * * *